UNITED STATES PATENT OFFICE.

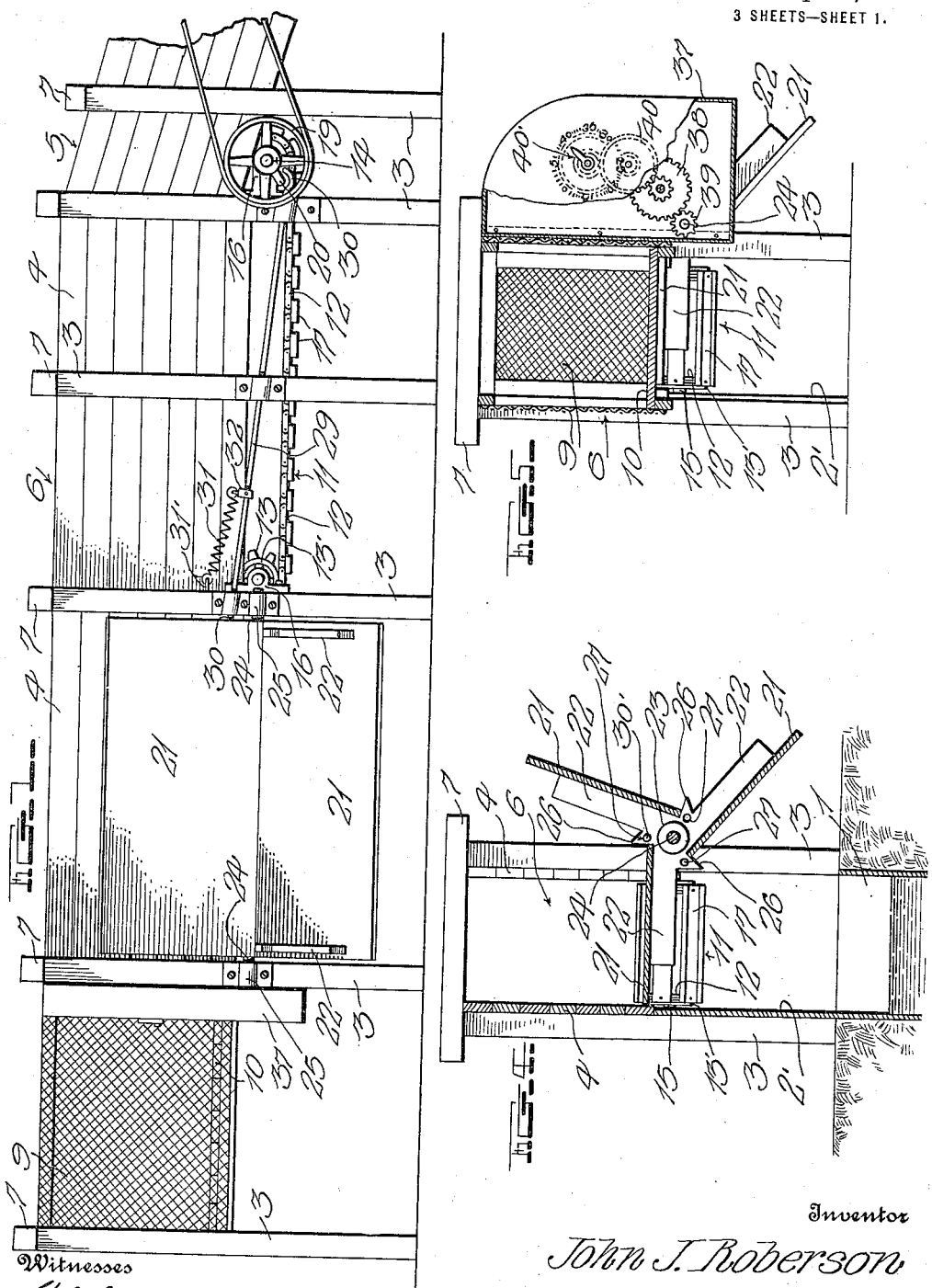

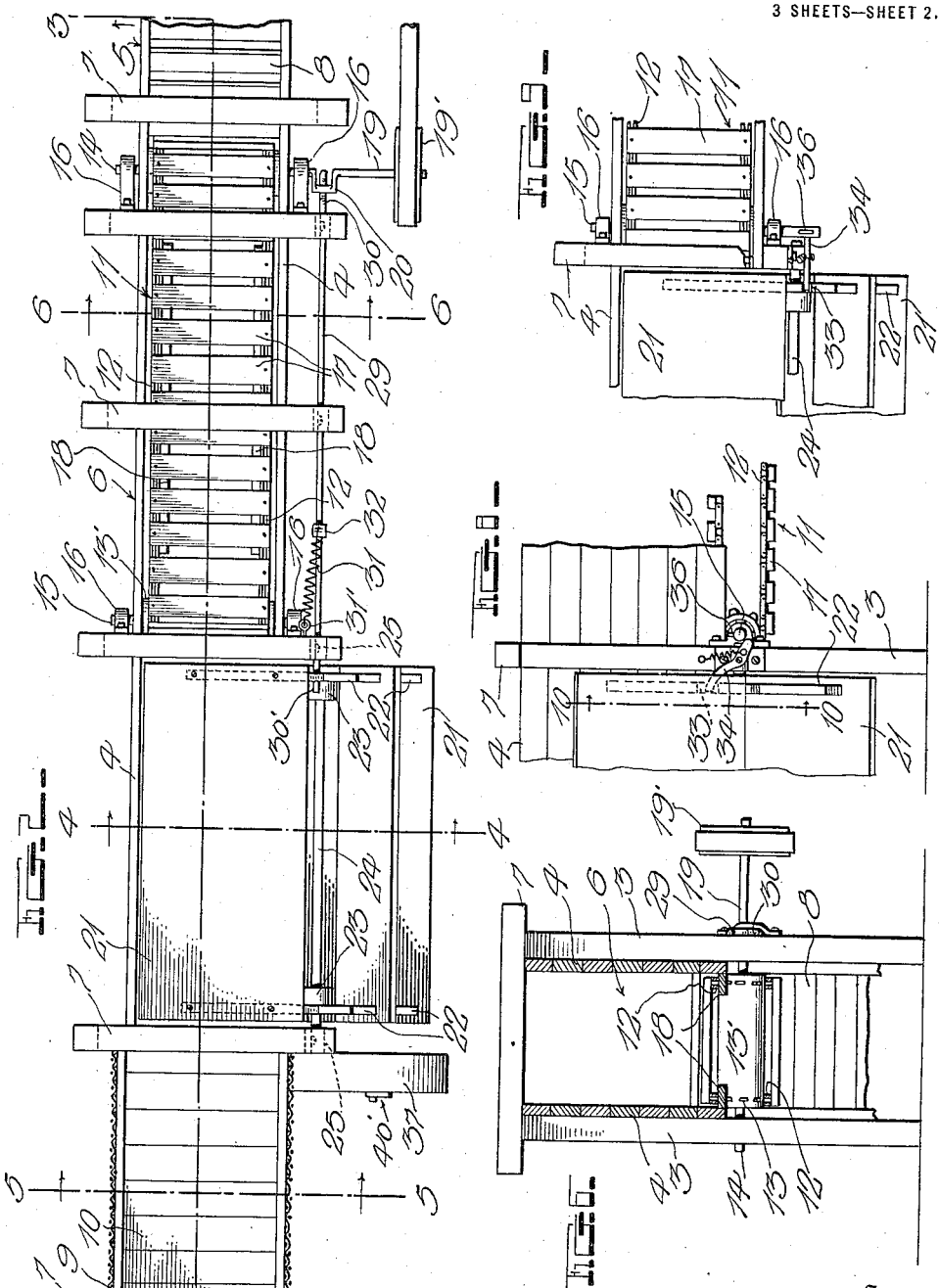

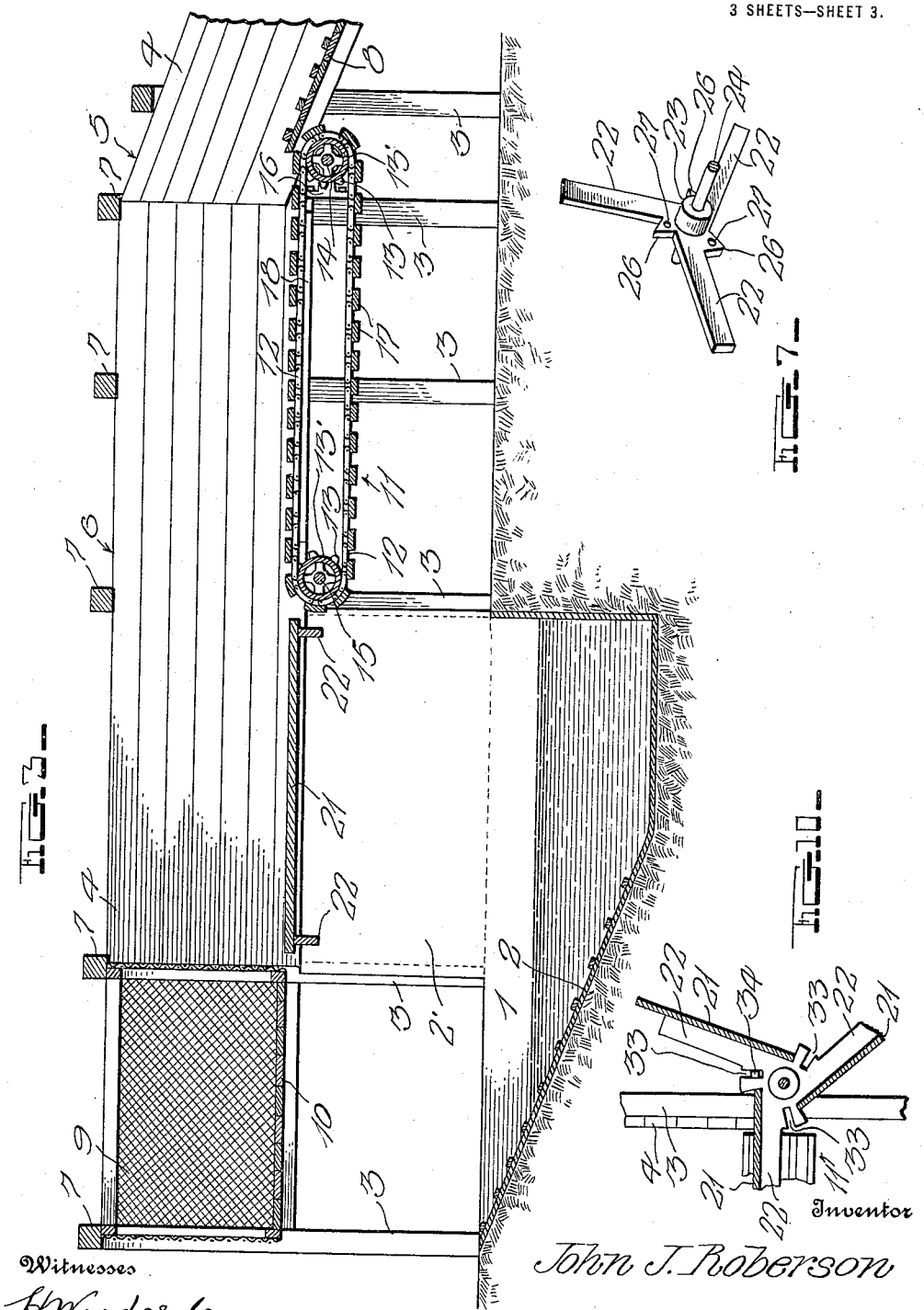

JOHN JAMES ROBERSON, OF SPRINGVILLE, UTAH.

AUTOMATIC SHEEP-DIPPER.

1,152,910.　　　　　　　Specification of Letters Patent.　　　Patented Sept. 7, 1915.

Application filed March 14, 1914, Serial No. 824,811. Renewed August 2, 1915. Serial No. 43,341.

*To all whom it may concern:*

Be it known that I, JOHN J. ROBERSON, a citizen of the United States, residing at Springville, in the county of Utah and State of Utah, have invented certain new and patentable Improvements in Automatic Sheep-Dippers; and I do hereby declare that the following is a full, clear, and exact description of the invention, such as will enable others skilled in the art to which it pertains to make and use the same.

This invention relates principally to the care of live stock but more generically to an apparatus for dipping sheep into a treating liquid for the purpose of cleaning disease germs in or on the hide.

One object of my invention is to minimize the time and labor required in the process of dipping sheet by providing an apparatus having means to facilitate the handling and dipping of large numbers of sheep or other animals in an expeditious manner.

Another object of this invention resides in providing a trap mechanism actuated by the weight of the sheep to precipitate the latter into the treating liquid.

Another and further object of this invention is to provide a means whereby the trap may be normally maintained in a fixed position, and at predetermined intervals released to permit the sheep to be dropped into the treating liquid.

Another object resides in providing a blind at one extremity of the apparatus by means of which the sheep may be enticed to traverse the trap mechanism.

Another and final object of this invention is to provide a series of floors for the trap mechanism arranged in angular relation, whereupon when one of the floors has been actuated by the sheep traversing the same, another of said floors will be brought into a horizontal plane to receive the on coming sheep.

With these and other objects in view my invention consists of certain novel details of construction, combination and arrangement of parts to be more particularly set forth and claimed.

Referring to the accompanying drawings in which corresponding parts are indicated by similar reference numerals throughout the various views, Figure 1 is a side elevation of my improved sheep dipping apparatus; Fig. 2 is a top plan view thereof; Fig. 3 is a longitudinal vertical section taken on the line 3—3 of Fig. 2; Fig. 4 is a transverse vertical section taken on line 4—4 of Fig. 2; Fig. 5 is a similar view taken on the line 5—5 of Fig. 2; Fig. 6 is a similar view taken on the line 6—6 of Fig. 2; Fig. 7 is a detail perspective view of one of the castings forming the trap mechanism; Fig. 8 is a fragmentary view illustrating a modified form of the trap releasing mechanism; Fig. 9 is a top plan view of the structure shown in Fig. 8; and Fig. 10 is a transverse vertical section taken on the line 10—10 of Fig. 8.

Briefly stated, my invention contemplates a runway upon which the sheep may be driven, an endless conveyer arranged in the length of the runway and adapted to convey the sheep to a trap situated at the inner extremity of the endless conveyer and located above a suitable liquid containing receptacle, the trap being so constructed as to be actuated by the weight of the sheep so as to precipitate the latter into the treating liquid, said trap however, being normally retained in a horizontal position by suitable tripping mechanism, which at predetermined times is operated so that the trap may revolve under the weight of the sheep thereon.

To this end, my invention comprises a well 1 which is disposed beneath the ground surface and adapted to contain a suitable treating liquid or disinfectant. The well 1 is provided with an inclined cleated wall 2 extending to the ground surface by means of which the sheep may ascend to the latter after being dipped, and also with the side extension 2'. On opposite sides of the well 1 in alined relation are a series of vertically arranged suitably spaced standards 3 which extend from the upper end of the inclined wall 2, to a point to the rear of the well. Secured to the outer surfaces of the standards 1 contiguous to the upper extremities thereof are side boards 4 which are so arranged as to produce the inclined and horizontal runways 5 and 6.

Reinforcing beams 7 are secured to the upper extremity of the standards 3 and extend transversely across the runways to firmly brace the sides thereof, as will be readily understood without further description. The inclined runway 5 is provided with a fixed cleated floor 8 up which the sheep may be driven to an endless conveyer to be hereinafter mentioned.

The horizontal runway 6 has the boards thereon spaced from its inner end and the latter circumscribed by a wire screen 9, the circumscribed end of the horizontal runway being provided with a fixed platform or floor 10. This arrangement is for the purpose of forming a blind on which a few sheep may be placed so as to entice other sheep to traverse the trap, and in this manner be precipitated into the treating solution. Disposed longitudinally in the horizontal runway 6 is an endless conveyer 11 extending from the upper end of the inclined floor 8 to a point in the horizontal runway, approximately above the inner end of the well 1. This endless conveyer consists of two endless chains 12 extending around the sprocket gears 13, formed on cylinders 13', which latter are keyed to the shafts 14 and 15 having their extremities journaled in the bearings 16, and secured to the uprights or standards 3 as clearly shown in Fig. 2.

Tread boards 17 are disposed transversely between the two endless chains 11 and secured at their opposite extremities thereto. To prevent sagging of the upper stretch of the endless conveyer 11, the lowermost side boards of the horizontal runway are provided with inwardly extending supports 18 which form runways over which the endless chains 12 may travel.

To operate the endless conveyer 11, the shaft 14 is provided with an extension 19 on the outer extremity of which is mounted a power pulley 19', the latter being suitably connected with propelling means (not shown). Extension 19 is provided with a crank 20, the purpose of which will be hereinafter described. In order that the sheep may be precipitated into the treating solution, there is provided a trapping mechanism intermediate the inner end of the endless conveyer 11 and the platform 10. This trapping mechanism comprises a plurality of angularly arranged floors 21 whose extremities are secured upon the outer edges of the radially projecting arms 22 extending from the castings or hubs 23, the latter being keyed upon the extremities of the shaft 24 which has its ends revolubly mounted in the bearings 25 secured to the standards 3. Between the arms 22 of the castings 23 there are formed the angular shaped projections 26 having apertures 27, the purpose of which will be hereinafter referred to. By arranging the floors in angular relation as herein above described, it will become apparent that when one of the latter is disposed in a horizontal position in the runway 6 and is traversed by one of the sheep, it will be revolved under the weight of the latter and carried downwardly which operation will cause the following floor to be disposed in proper horizontal position so as to receive the on coming sheep as will be understood without further description.

However, as it is only desirable to release the floors 22 at predetermined intervals, a trap releasing mechanism is provided, consisting of a rod 29, the latter being secured to the exterior surface of the standards 3. One end of the rod 29 is arcuate-shaped as at 30 and the opposite end 30' is adapted to project into the openings 27 formed in the angular projections 26 of the castings 23, which openings, when the floors 22 are in horizontal position, register with said end 30' of the rod 28 so as to receive the same, and thus securely retain the floors in proper position to be traversed by the sheep conveyed thereto by the endless conveyer 11.

Inasmuch as the arcuate-shaped end 30 of the rod 29 is disposed in the path of the crank 20 it will be seen that said rod will be actuated and the end 30' disengaged from its seat, whenever the crank 20 contacts therewith, and the sheep thereon dropped into the treating liquid, consequently the floors 22 will be released whenever the shaft 14 makes a complete revolution. To normally maintain the end 30' in the openings 27 as well as to retract the rod 29 after the actuation thereof, a spring 31 has one end secured to the wire screw 31' which latter is fastened to one of the standards 3, the other end of said spring being connected to the rod 29 as at 32.

As a modification of the trapping mechanism just described, I may provide the casting or hub 23 with notches 33, said notches being adapted to receive the upper extremity of the lever 34 which is pivoted intermediate its ends on one of the bearings 25, the lower end of said lever projecting from the bearing and coöperating with a pin 36 formed on an extension of the shaft 15, from which it will be seen that every complete revolution of the shaft will disengage the lever and consequently permit the floor to revolve under the weight of the sheep, as will be readily understood without further description.

In order that the operator may be informed as to the number of sheep dipped, I provide a casing 37 at the inner end of the shaft 24. Within the casing is a pinion 38 which meshes with a pinion 39 formed on the inner end of the shaft 24. This pinion 38 actuates a series of meshing pinions 40 which controls the recording device 40', as will be readily understood without further description.

Thus it will be seen that with my improved device constructed as above, the *modus operandi* will be as follows: The sheep are driven up the inclined floor 8 to the endless conveyer 11 by means of which they are carried to the revoluble floors 21, and in attempting to cross the same, to reach the sheep in the blind, they are by reason of the release of the trapping mechanism and displacement of the floors precipitated into the treating solution, from whence they may ascend by means of the inclined floor 2 to the ground surface.

Thus it will be seen that I have provided an extremely simple and efficient means for quickly and conveniently disinfecting the hides of sheep or other animals in a minimum time required for such process.

Although by the foregoing I have described certain elements as best adapted to perform the functions ascribed to them, nevertheless it is to be understood that various minor changes of form, substance, etc., may be resorted to within the scope of the appended claims without departing from or sacrificing any of the principles of this invention.

Having now described my invention, what I claim is:—

1. In an automatic sheep dipper, the combination with a runway and a tank disposed beneath the same, of a trap mechanism situated in the length of the runway above the tank, and including a shaft rotatably secured to and extending longitudinally of the runway, a plurality of angularly arranged floors carried by said shaft, and adapted to have their upper surfaces successively brought into horizontal alinement with that of the runway floor, means to lock said floors as the latter are brought into said horizontal position, and other means coöperating with the last mentioned means to actuate the latter and release said floors substantially as and for the purpose set forth.

2. In an automatic sheep dipper the combination with a runway and a tank disposed beneath the same, of a trap mechanism situated in the length of the runway above said tank and including a shaft rotatably secured to and extending longitudinally of the runway castings keyed upon the extremities of said shaft, radially extending arms carried by said castings, a plurality of floors disposed between the latter, and having their extremities secured to the arms thereon, whereby the upper surface of said floors may be successively brought into horizontal alinement with that of the runway floor, means to lock said rotatable floors as the latter are brought into said horizontal position and other means coacting with the last mentioned means to actuate the latter and release said horizontally disposed floor substantially as and for the purpose set forth.

3. In an automatic sheep dipper the combination with a runway and a tank disposed beneath the same; of an endless conveyer traveling in the length of said runway, means to actuate said conveyer, a trap mechanism disposed at the inner extremity of said conveyer, and including a shaft rotatably secured to and extending longitudinally of the runway, a plurality of angularly arranged floors carried by said shaft, and adapted to have their upper surfaces successively brought into horizontal alinement with that of said conveyer to form a continuation thereof, means to lock said rotatable floors as the latter are brought into said horizontal position and means in connection with said conveyer actuating means for coöperation with the first mentioned means to actuate the latter and release said floors substantially as and for the purpose set forth.

4. In an automatic sheep dipper the combination with a runway and a tank disposed beneath the same of an endless conveyer traveling in the length of said runway, means to rotate said conveyer, a trap mechanism situated at the inner extremity of said conveyer, and including a shaft rotatably secured to and extending longitudinally of the runway, castings keyed upon the extremities of said shaft, radially extending arms carried by said castings, a plurality of floors disposed between the latter and having their extremities secured to the arms thereon, whereby the upper surfaces of said floors may be successively brought into horizontal alinement with that of said conveyer, means to lock said rotatable floors when the latter are brought into a horizontal position, and means in connection with said conveyer rotating means for coöperation with the last mentioned means to actuate the latter and release said floors substantially as and for the purpose set forth.

5. In an automatic sheep dipper the combination with a runway and a tank disposed beneath the same; of a trap mechanism situated in the length of the runway above said tank and including a shaft rotatably secured and extending longitudinally of the runway, castings keyed upon the extremities of said shaft, radially extending arms carried by said castings, an apertured projection formed on the latter intermediate each of said arms, a plurality of floors disposed between said arms, and having their extremities secured thereto whereby the upper surfaces of said floors may be successively brought in horizontal alinement with that of the runway floor, a locking rod reciprocatively secured to the side of the runway and extending longitudinally thereof, one end of said rod being adapted to normally project into the opening formed in the projection on said casting when the floors are brought into a horizontal position, means coöperating with the opposite end of said rod to reciprocate the latter and withdraw the engaged end thereof from said opening to release said floors, and means to assist in restoring said rod to its normal position substantially as and for the purpose set forth.

6. In an automatic sheep dipper, the combination with a runway, the latter including spaced supporting members having side sections secured thereto and a flooring arranged intermediate the same, the flooring and one of said side sections having therein an opening of a well, beneath said runway, an endless conveyer disposed in the opening in said floor and extending longitudinally of the runway, means to actuate said conveyer, a trap mechanism also arranged in said floor opening above the well and at the inner extremity of said endless conveyer, said trap mechanism consisting of a shaft extending longitudinally across the opening in said side section and rotatably connected at its extremities to adjacent supporting members, a plurality of angularly arranged floors carried by said shaft and adapted to be rotated through the opening in said side section whereby to bring their upper surfaces into horizontal alinement with that of said conveyer, means to lock said floors after the latter have been brought to horizontal position, and means in connection with said conveyer actuating means for coöperation with the last mentioned means to actuate the latter and release said floors substantially as and for the purpose set forth.

JOHN JAMES ROBERSON

Witnesses:
 J. L. WHITING,
 BIRD HUNTINGTON.

Copies of this patent may be obtained for five cents each, by addressing the "Commissioner of Patents, Washington, D. C."